United States Patent [19]

Hayama et al.

[11] 3,775,177

[45] Nov. 27, 1973

[54] PROCESS FOR MAKING A SEMICONDUCTOR ELEMENT

[76] Inventors: Shigeru Hayama, 1-1, 2-chome, Rinsengi, Yonezawa-shi; Shogo Niino, 7-1, 2-chome, Higashi, Yonezawa-shi, both of Japan

[22] Filed: July 26, 1971

[21] Appl. No.: 166,318

[30] Foreign Application Priority Data
Feb. 26, 1971  Japan................................ 46/9730

[52] U.S. Cl................. 117/230, 117/232, 260/2 R, 260/2 H
[51] Int. Cl............................ B44d 1/34, B44d 1/42
[58] Field of Search..................... 117/201, 161 UF, 117/161 R, 218, 130, 132, 230, 232; 260/2 R, 2 H

[56] References Cited
UNITED STATES PATENTS

| | | | |
|---|---|---|---|
| 3,082,177 | 3/1963 | Anderson............................ | 260/2 H |
| 3,560,428 | 2/1971 | Billow............................... | 260/2 H X |
| 3,669,929 | 6/1972 | Billow............................... | 260/2 H X |
| 3,076,785 | 2/1963 | Kiessling et al.................. | 260/2 H X |

*Primary Examiner*—Alfred L. Leavitt
*Assistant Examiner*—M. F. Esposito
*Attorney*—Kemon, Palmer & Estabrook

[57] ABSTRACT

Semiconductor elements are made of organic polymer by first forming an aqueous solution of a tetrazocompound made by tetrazotization of a benzidine compound or a diaminostilbene compound, adding to the solution a transition metal or a salt thereof to precipitate an addition compound and heating said addition compound to polymerize it into a polymer having a molecule weight of about 1,000 to 50,000 that is soluble in organic solvents and comprises a multiplicity of phenylene groups. The polymerization of the addition compound may be performed in the presence of vinyl monomers to produce copolymers.

1 Claim, No Drawings

PROCESS FOR MAKING A SEMICONDUCTOR ELEMENT

This invention relates to a process for manufacturing a semiconductor element and more particularly to such process in which a metal surface is coated with a film formed of polyphenylene or its copolymer including a major component of a phenylene nucleus soluble to various solvents and having a long conjugate double bond. For the purpose of description this polymer will hereinafter be called substituted polyphenylene polymer or copolymer.

The substituted polyphenylene represented by the general formula

or

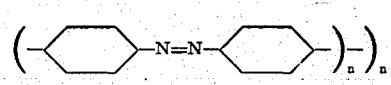

or

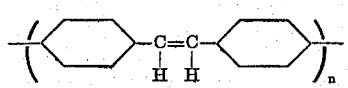

is expected to have a structurally good heat proof property. Further it is theoretically shown that the substituted polyphenylene is an electrically conductive high molecular weight substance when it has a long conjugate double bond.

Various attempts have heretofore been made to synthesize polyphenylene from various aromatic compounds, but few of them have yet succeeded in obtaining a polymer having a desirable polymerization degree and which is soluble in an organic solvent.

It is known that polyphenylene can be obtained by reacting ammoniac $Cu^+$ with biphenyltetrazonium chloride formed by converting benzidine hydrochloride into a tetrazo-compound. The polymer obtained through this reaction, however, is mostly insoluble to an organic solvent and exhibits no melting point, so that it can not be taken out in a pure form.

It has been found that the insolubility in an organic solvent of the reaction product of biphenyltetrazonium chloride (hereinafter called BTC) and ammoniac $Cu^+$ is due to branching or cross linking during the reaction in an alkaline system due to diazo coupling. According to this invention, BTC is solely separated in a pure crystalline form, thereafter made into an addition compound to block their diazonium functions and polymerized to obtain an organic solvent-soluble polymer or copolymer. It has been found that the substituted polyphenylene or its copolymer can be used for manufacturing a semiconductor element because of its solubility and conductivity.

The invention will be more fully understood from the following detailed description.

Benzidine, a benzidine compound having a substituent or the phenyl nucleus, such as tolidine, dimethoxybenzidine, dihydroxybenzidine, dichlorbenzidine or dicarboxybenzidine, a benzidine compound having phenyl nuclei bonded with azo group, diaminostilbene or a diaminostilbene compound having various substituents (hereinafter collectively called biphenyldiamine) is caused to react with hydrochloric acid and sodium nitrite in the presence of a small amount of water. To the resultant solution is added a water-affinitive solvent, such as, a salt or acetone with the reuslt that a tetrazo-compound of biphenyldiamine (hereinafter called substituted BTC) is separated in the form of pure crystals. The crystals of substituted BTC, for example, are dissolved in pure water or an aqueous solution of weak acidity. To the solution is then added a transition metal or its salt to produce an addition compound. The addition compound is greatly active and polymerizes, when heated, to produce polyphenylene polymer while emitting nitrogen. Ultimate analysis, infrared spectrum and X-ray diffraction analyses indicate that the polymer obtained is polyphenylene locally containing an azo group and has a molecular weight of 1,000 to 16,000 or above.

The tetrazocompound used as the starting material may be separated in the form of pure crystal by permitting, for example, benzidine hydrochloride to react with hydrochloric acid and sodium nitrite in the presence of a small amount of water for conversion into tetrazo-compound and adding thereto a greatly excess amount of sodium nitrite or acetone. The resultant crystal is in general yellow and soluble in water.

The tetrazocompound is dissolved in pure water or an aqueous solution of weak acidity and is caused to react with a transition metal or a salt thereof in the neighborhood of neutrality. If the pH of the solution is inclined to acidity, a polymer to be obtained will have a small molecular weight, while an insoluble and non-melting polymer will be produced in the case of the pH being in the alkalinity side. However, if a tetrazocompound prepared from dicarboxybenzidine or diamine having an acid group, such as diaminostilbene disulfonic acid, in the phenyl nucleus is dissolved in pure water or an acid aqueous solution, a desirable organic solvent-soluble polymer may be obtained even if the material is subjected to treatment by a transition metal or a salt thereof suspended in pure water or an alkaline aqueous solution, such as dilute ammonia. The transition metal or salts thereof to be added to the aqueous solution of a tetrazocompound may either be in the particle or powdery form or, when the salt is water-soluble, in the form of an aqueous solution thereof.

The addition reaction between the tetrazocompound and the transition metal or a salt thereof may proceed at the normal temperature, but should preferably be carried out at a lower temperature say below 20°C in order to avoid the occurrence of a sub-reaction. As the reaction proceeds, a brown precipitate is produced. The termination of the reaction can be detected by observing the non-existence of the diazonium function which is represented by coloration exhibited by β-naphthol.

The addition compound produced through the above described reaction is greatly active and a reaction mixture thereof starts polymerization by being merely heated at 50°C, preferably 80°C, excessively generating nitrogen. After the generation of nitrogen terminates, the reaction is completed by maintaining the mixture at the same temperature for further 10 to 30 minutes. The polymer obtained through the stated reaction forms a brown or dark brown precipitate. The polymer is removed from the solution, boiled for a short period of time together with a small amount of acid such as dilute acetic acid thereby to dissolve and remove impurities, washed, if desired, and dried. The polymerization can also be effected by introducing the addition compound into a polar solvent, such as N,N-dimethylformamide, dimethylsulfoxide, tetrahydrofuran, pyridine, methylethylketone or acetone, an aqueous solution of salts, an aqueous solution of acid or an alkaline aqueous solution and by heating the mixture at a temperature of about 50° to 80°C. In the above reaction, the addition compound is polymerized likewise generating nitrogen and gives rise to a precipitate of polymer. Although there is a slight shift depending upon the condition of polymerization, the precipitate is a substituted polyphenylene having a molecular weight of 1,000 to 16,000 or above, which is soluble to various organic solvents.

Since the polymer possesses a conjugate double bond, it has an electrical conductivity of the order of $10^{-2}$ to $10^{-3}$ $\Omega^{-1}.cm^{-1}$ which covers the range of conductivity displayed by a semiconductor. The polymer which has a melting point of around 200°C or above or no melting point, can be sufficiently utilized as an organic semiconductive material. Further, the polymer according to this invention may be separated into a low molecular weight component soluble to methanol and a high molecular weight component insoluble thereto by observing whether or not the polymer is soluble to methanol. The high molecular weight component may still further be separated into components each having a molecular weight of specifically limited range. This may be achieved by dissolving said high molecular weight component in a benzene solvent and gradually adding small amounts of petroleum benzine to said solvent thereby to obtain separate precipitates.

The substituted polyphenylene according to the invention may be dissolved in an organic solvent, such as benzene, tetrahydrofuran, dioxane, chloroform, acetone, dimethylformamide or dimethylsulfoxide. They may also be dissolved in alcohols and ketones when biphenyldiamine having an acid union in the phenyl nucleus is employed for synthesizing the substituted polyphenylene.

A semiconductor element according to the process of this invention is produced by depositing on a clean metal surface a film of the substituted polyphenylene by use of the above described solvent. The substituted polyphenylene forming the film has a molecular weight of about 1,000 to 16,000. But there can be produced one of which molecular weight amounts as much as to 50,000. Thus it will be apparent that the material has a long conjugate double bond and the number of $\pi$ electrons amounts to 40 to 1,400. As stated already, since the material has a melting point around 200°C or above or no melting point, it is greatly insensible to temperature change. Experiments show that the film functions to shift the specific wavelength 250m$\mu$ of biphenyl by 130m$\mu$ and has an inherent ultraviolet absorption. These properties of the film are in agreement with those to be possessed by organic semiconductors, and this will explain the excellency of the semiconductor element according to the process of the invention.

A reaction mixture including some different addition compounds produced through the above described reaction with two or three kinds of substituted BTC, starts copolymerization by being merely heated at 50°C, preferably 80°C, excessively generating nitrogen. The polymer obtained by this copolymerization forms a brown or dark brown precipitate which is a copolymer having each corresponding phenylene nucleus in the original biphenyldiamines used. Further a reaction mixture including an addition compound and a vinyl monomer such as vinyl acetate, styrene, acrylonitrile, methylmethacrylate, acrylamide, etc. starts copolymerization by being heated at a temperature of about 50° to 80°C. The polymer obtained by this copolymerization forms a yellowish brown or brown precipitate which is soluble to various organic solvents and is a block copolymer having an original phenylene nucleus and a vinyl bond therein.

The invention will further be explained by way of the following examples.

EXAMPLE 1

A mixture of 28g of benzidine hydrochloride, 30ml of water and 15ml of 35 percent hydrochloric acid is prepared. To the mixture maintained at 5° to 10°C is dropped an equivalent amount of sodium nitrite to cause the benzidine hydrochloride to become a tetrazocompound. The mixture is maintained at 0° to 5°C after being subjected to drops of excess sodium nitrite, and thereafter added with 50ml of acetone thereby to produce BTC. The BTC is washed with acetone and then dried. 40g of the resultant BTC crystal is dissolved in pure water and added with an equivalent amount of a powder of ferrous(II) chloride little by little at 5°C for a few hours, with the result that the formation of a brown precipitate is observed. The reaction mixture is allowed to polymerize by heating at 50°C. After the generation of nitrogen from the mixture terminates, the mixture is maintained at 80°C for 30 minutes to complete the reaction. The reaction mixture is heated for 30 minutes after addition of a small amount of dilute acetic acid. A ferro compound is dissolved in the reaction liquid and thereafter the latter is removed to obtain a massive precipitate of polyphenylene polymer. The mass is then gathered, washed with water and dried.

The polymer obtained is placed in methanol so as to cause its component soluble to methanol to dissolve therein. The remaining unsoluble component is dissolved in benzene. To the solution is added petroleum benzine little by little in order to cause the dissolved component to separately precipitate thereby to obtain five separate components. Each of these separate components is independently dissolved in dioxane and each solution is dropped on a copper plate and dried to form thereon a film of polyphenylene polymer. The details of the five components are shown in Table 1.

TABLE 1

| Component | Molecular Weight | Yield (%) | m.p. (°C) | Number of bonded phenylene | Electrical Conductivity $\Omega^{-1}cm^{-1}$ |
|---|---|---|---|---|---|
| 1 | 16,000 | 10.0 | non | 202 | — |
| 2 | 8,000 | 6.7 | non | 101 | $3.1 \times 10^{-2}$ |
| 3 | 4,000 | 8.3 | 255 to 270 | 50 | — |
| 4 | 3,400 | 2.3 | 250 to 270 | 43 | — |
| 5 | less than 2,700 | 27.8 | less than 260 | — | — |

The following experiments were carried out to detect the characteristics of the polyphenylene polymer and a

Experiment 1

A methanol-insoluble component of polyphenylene produced by the above described method is dissolved in benzene and seven different components are prepared by adding small amounts of petroleum benzine to the benzene solution thereby causing the dissolved material to separately precipitate.

0.1g of each of the seven components is dissolved separately in 5ml of dioxane. By use of the solutions, seven films of different polymers are formed on the surface of a clean copper plate to measure their properties and conductivity. The copper plate is previously cleaned with dilute acid and further washed with acetone. The thicknesses of the seven films are previously measured respectively at four different points to obtain an average value. The voltage-current characteristics of each sample piece are recorded on a graph paper by means of an automatic recording device. The characteristics indicate a linear change and the resistance value($\Omega$) is calculated on the basis of the value of a voltage corresponding to 100$\mu$A. Silver is used as a conductor for connecting each said film and a copper line in such a manner as to define the contact area(S) between the surface of each film and the silver to $3.14 \times 10^{-2}$cm$^2$. The results are shown in Table 2.

TABLE 2

| Sample piece | Molecular weight | Number of $\pi$ electrons | M.P. (° C.) | Thickness (cm.) | Resistivity ($\Omega$) | Conductivity ($\Omega^{-1}$·cm.$^{-1}$) |
|---|---|---|---|---|---|---|
| 1 | 27,000 | 1,420 | None | $1.70 \times 10^{-2}$ | 11.7 | $4.63 \times 10^{-2}$ |
| 2 | 13,500 | 710 | None | $1.22 \times 10^{-2}$ | 12.0 | $3.24 \times 10^{-2}$ |
| 3 | 5,300 | 280 | None | $1.96 \times 10^{-2}$ | 50.0 | $1.25 \times 10^{-2}$ |
| 4 | 2,700 | 142 | 260 | $1.24 \times 10^{-2}$ | 77.6 | $5.09 \times 10^{-3}$ |
| 5 | 1,800 | 94 | 210 | $6.00 \times 10^{-3}$ | 11.1 | $1.72 \times 10^{-2}$ |
| 6 | 1,500 | 79 | 203 | $6.90 \times 10^{-3}$ | 18.1 | $1.21 \times 10^{-2}$ |
| 7 | 900 | 47 | 158 | $6.90 \times 10^{-3}$ | 23.2 | $9.43 \times 10^{-3}$ |

Experiment 2

0.2g of each of the seven components in Experiment 1 is introduced into a tablet forming apparatus, where it is subject to a total pressure of 4 tons for 1 minute under a reduced pressure of $10^{-3}$mmHg. Each of the tablets formed is measured as to its conductivity. It is found that they are either substantially non-conductive or failed to allow the conductivity to be measured due to a leak caused by silver attached on the both surfaces thereof.

Experiment 3

The polymer having a molecular wieght of 27,000 in Experiment 1 is dissolved in tetrahydrofuran at a concentration of 0.2mg/100ml and its ultraviolet absorption is measured in the range of wavelengths of 200m$\mu$ to 700m$\mu$. The absorption of the polymer solution is 280m$\mu$ and the specific absorption of biphenyl is 250m$\mu$, with the result that substantially no difference is observed between them.

Experiment 4

The polymer solution in Experiment 3 is used to form a film and the film is deposited on a cell for ultraviolet absorption measurement. The result of measurement shows that the ultraviolet absorption of the film is 380m$\mu$ thus shifting from said specific absorption of biphenyl by 130m$\mu$, which exhibits an absorption spectrum inherent to the polymer and differing from that of the solution.

Experiment 5

A film used for the measurement of electrical conductivity shows the photo-electricity if this film is exposed to the ultraviolet ray or the electric lamp. Further this film shows the pressure-electricity under a strong pressure.

EXAMPLE 2

BTC obtained by a method similar to that described in Example 1 is dissolved in pure water to prepare a 20 percent aqueous solution. A reaction-equivalent substance of a powder of cuprous chloride is added to the solution and maintained at 5°C for a few hours with the result that the formation of a brown precipitate is observed. The reaction mixture is allowed to react by heating slowly elevating the liquid temperature until 80°C for 3 hours adding an equivalent amount of acrylonitrile monomer under agitation. After the generation of nitrogen from the mixture terminates, the mixture is maintained at 80°C for 30 minutes to complete the copolymerization. The reaction mixture is heated for 30 minutes after being added with a small amount of dilute acetic acid. A cupric compound is dissolved in the reaction liquid and thereafter the latter is removed to obtain a massive precipitate of phenylene-acrylonitrile copolymer. The mass is then gathered, washed with water and dried.

The polymer obtained is placed in methanol so as to cause its component soluble to methanol to dissolve therein. The remaining unsoluble component is dissolved in benzene. To the solution is added petroleum benzine little by little in order to cause the dissolved component to separately precipitate thereby to obtain separate components. 0.1g of each of separate components is independently dissolved in dioxane. By use of the solutions, films of different polymer are formed on the surface of a clean copper plate to measure their electrical conductivity by a method described in Experiment 1. The results obtained are $10^{-6}$ to $10^{-8} \Omega^{-1}$.cm$^{-1}$.

What is claimed is:

1. A process for the manufacture of a semiconductor element which comprises:
   forming biphenyltetrazonium chloride (BTC) by tetrazotization of benzidiene hydrochloride with sodium nitrite at between about 0° to 10°C.,
   isolating crystalline BTC from the tetrazotization mixture,
   dissolving the crystalline BTC in water to form an aqueous BTC solution,
   adding ferrous chloride to the resulting aqueous BTC solution to form a precipitated addition compound,
   heating the addition compound to between 50° to 80°C. to form a polyphenylene polymer,
   dissolving the polyphenylene polymer in dioxane, and
   forming a film of polyphenylene polymer upon a metal substrate from the solution of polymer in dioxane.

* * * * *